(12) United States Patent
Rosman et al.

(10) Patent No.: US 6,222,550 B1
(45) Date of Patent: Apr. 24, 2001

(54) MULTIPLE TRIANGLE PIXEL-PIPELINES WITH SPAN-RANGE PIXEL INTERLOCK FOR PROCESSING SEPARATE NON-OVERLAPPING TRIANGLES FOR SUPERSCALAR 3D GRAPHICS ENGINE

(75) Inventors: Andrew Rosman, Palo Alto; Ming-Ju Li, Cupertino, both of CA (US)

(73) Assignee: Neomagic Corp., Santa Clara, CA (US)

( * ) Notice: Subject to any disclaimer, the term of this patent is extended or adjusted under 35 U.S.C. 154(b) by 0 days.

(21) Appl. No.: 09/215,506

(22) Filed: Dec. 17, 1998

(51) Int. Cl.$^7$ ..................................... G06F 15/00
(52) U.S. Cl. ............................................... 345/419
(58) Field of Search ........................... 345/419, 426, 345/427, 428, 429, 430, 433, 117, 121

(56) References Cited

U.S. PATENT DOCUMENTS

| | | | |
|---|---|---|---|
| 4,951,232 | 8/1990 | Hannah | 364/522 |
| 5,175,809 | 12/1992 | Wobermin et al | 395/141 |
| 5,214,753 | 5/1993 | Lee et al. | 395/125 |
| 5,307,449 | 4/1994 | Kelley et al. | 395/119 |
| 5,388,205 | 2/1995 | Cantor et al. | 395/162 |
| 5,579,455 | 11/1996 | Greene et al. | 395/122 |
| 5,649,173 | 7/1997 | Lentz | 395/513 |
| 5,706,415 | 1/1998 | Kelley et al. | 395/126 |
| 5,748,864 | 5/1998 | Martin | 395/122 |
| 5,761,400 | 6/1998 | Derby et al. | 395/122 |

*Primary Examiner*—Phu K. Nguyen
(74) *Attorney, Agent, or Firm*—Stuart T. Auvinen

(57) ABSTRACT

A 3D graphics processor has parallel triangle pixel pipelines. One or more triangle setup engine(s) receives triangle primitives from a host or geometry engine and generates vertex color, texture and other attributes as well as their gradients. The triangle setup engine makes available all required triangle data to the triangle pixel pipelines. The triangle pixel pipelines accept the next triangle data on a demand basis, when finished with the previous triangle. Each triangle pixel pipeline has a span engine that generates endpoints along the 3 edges of the triangle where the horizontal lines (spans) intersect. Each triangle pixel pipeline also has a raster engine that receives the endpoints as well as gradients and generates color, texture and other attributes for each pixel along a span between endpoints. The raster engine then composites pixels from these attributes and updates visible pixels in the frame buffer. Pixel-memory coherency for Z-buffering is maintained by comparing an MSB part of the X pixel address and the span line number (Y address) of pixels being processed in each pipeline. Thus a span-range of pixels is compared rather than individual pixels. When span-ranges of pixels being rasterized in two different triangle pixel-pipelines overlap, one of the pipelines must stall until the other finishes the span-range. For rendering modes with alpha-blending enabled or Z-buffering disabled triangle input order must be maintained during pixel rasterization. To maintain proper order, bounding boxes of triangles processed in different pipelines are compared. When the bounding boxes overlap, even if the triangles do not overlap, one pipeline is held until the other completes the triangle.

20 Claims, 5 Drawing Sheets

MULTIPLE TRIANGLE PIXEL-PIPELINES WITH SPAN-RANGE PIXEL INTERLOCK FOR PROCESSING SEPARATE NON-OVERLAPPING TRIANGLES FOR SUPERSCALAR 3D GRAPHICS ENGINE

FIELD OF THE INVENTION

This invention relates to 3D graphics systems, and more particularly to multiple or parallel 3D pipelines.

BACKGROUND OF THE INVENTION

Portable notebook or laptop personal computers (PCs) have become enormously popular. Portable PC's have traditionally had lower-performance components than desktop PC's. In particular, these notebook PC's have suffered from lower-quality graphics while desktop PC's are more likely to have better graphics.

An extremely compute-intensive use of a PC is the rendering of three-dimensional (3D) objects for display on a two-dimensional display screen. Yet 3D-graphics applications are becoming more popular with computer users and should continue to gain popularity as higher-performance computers emerge.

Three-dimensional objects or surfaces are approximated as connected polygons, usually triangles. Greater detail can be obtained by using a greater number of smaller triangles to approximate the object as well as texture maps to render the surface material type. The 3D pipeline consists of two major segments or processes. The first segment is commonly referred to as Geometry. In turn, Geometry consists of Transformations and Lighting. First, the 3D polygonal database is transformed to image space through the mathematical transformations of translation, rotation, clipping, projection and scaling. Next, lighting and atmospheric effects are added. The second major pipeline segment is the Rasterization process. In turn, this process consists of triangle set-up and pixel rasterization. In a typical Application Interface (API), any or all pipeline segments may be accelerated in hardware. The focus of this invention relates to an improved method for hardware acceleration of the last stage, mainly Pixel Rasterization, henceforth referred to as the Pixel Engine (PE).

The image displayed on the computer's screen is generated from the position and attitude, surface attributes such as color and texture as well as environmental conditions such as lighting and atmosphere. The Geometry process produces image-space triangles described by three vertices and their color, depth, texture and other attributes. The Triangle Set-Up process produces the adjusted pixel positions as well as the attribute gradients. The Pixel Pipe then has the responsibility of generating all the pixel colors within the triangle. It uses the starting values and interpolates across the triangle by means of incremental methods; both linear and non-linear interpolations are required. The final color for each pixel is composited from all the attributes being combined in a manner selected by the application. Thus a large amount of computational work is needed to interpolate and composite the colors of the many pixels within the triangle.

The color of a pixel is designated by the intensity of the red, green, and blue (RGB) color components. Each color component may be encoded as a multi-bit binary value. Other components, such as depth, fog, texture, specular reflectivity, and the blending-factor alpha ($\alpha$), are often used. These components can be used for blending, shading, or distance effects and are herein designated by the letter A.

The 3D graphics engine first sets up individual triangles for rendering, performing any transformations necessary. Color, texture and other attribute values and their gradients for each triangle are output from a triangle setup engine (TSE) to the Pixel Pipes. A span engine (SE) "walks" each of the three edges of the triangle, determining endpoint pixel and attribute values where horizontal-line "spans" intersect the triangle edges. Then a raster engine (RE) receives an endpoint for a span and interpolates the attribute values for each pixel on the span. The visible pixels are then written to a frame buffer for display.

PARALLEL PROCESSING

Higher-performance 3D systems could benefit if superscalar or multiple pipelines were used. Rendering of pixels or triangles could be performed in parallel, multiplying the pixel throughput. Other systems, such as described by Kelly et al., U.S. Pat. No. 5,307,449, performed pre-processing during the previous frame rather than the current frame, increasing latency. Parallelism was provided on a scan-line basis by parallel pipelines. Watkins, U.S. Pat. No. 5,598,517, uses parallel rendering processors that render primitives using a multi-level hierarchy. Parallelism is provided for areas of triangles, rather than for the triangles themselves.

Parallelism may be provided in several different ways. Parallel raster engines (RE) could output pixels in parallel for the same scan lines in a triangle. Parallel span engines, each feeding a separate raster engine, could operate on two spans in the same triangle. Both of these schemes provide limited performance gains since parallelism is provided within a single triangle thus limiting the efficiency of load-balancing among parallel pipelines.

Better performance could be achieved by processing entire triangles in parallel. Since triangles contain many spans, a larger chunk of pixels can be processed in parallel, improving performance trough more efficient load-balancing among parallel pipelines. Unfortunately, synchronization of these parallel triangle pixel-pipelines is problematic under certain operational modes.

Triangles may vary widely in size, and thus some triangles may take much more time to render than others. When triangles being processed in the two pipelines overlap, special care is required to avoid display errors. A depth or Z buffer may be used to depth-resolve pixels in a triangle, allowing parallel triangle rendering. However, the two triangles being rendered may access the same pixel at the same time. One pipeline could update a pixel while the other pipeline is reading the pixel, resulting in a pixel error. Many clock cycles may be required during the memory access to read or write the pixel.

Semaphores or mailboxes may be used by the two pipelines to coherently share pixels. FIG. 1 shows semaphores for pixels in a 3D parallel processor. Each pixel 12 contains the R,G,B and other component values. Stored along with each pixel 12 is semaphore 14. Semaphore 14 is set by one pipeline to lock out the other pipeline from accessing the pixel after it has initiated a memory access to the pixel.

Although using semaphores 12 is a robust method to ensure coherency, table 10 can be quite large in size, since there may be more than one million pixels displayed. The additional bit may be difficult to 'fit' into commercially available memory chips usually configured along byte boundaries.

SCOREBOARD TABLES—FIG. 2

FIG. 2 illustrates a scoreboard method for pixel-access coherency for parallel triangle pixel-pipelines. Rather than provide a semaphore for each pixel on the screen, a scoreboard table is provided for each pipeline. The scoreboard contains a list of pixels currently being processed in that pipeline. The other pipeline must compare addresses of pixels entering its pipeline to the pixels in the other pipeline's scoreboard table. The pipeline is held or the new pixel is halted when a match occurs.

Pipeline 1 has scoreboard table 20 that includes pixel addresses 16 for each pixel being processed by pipeline 1. Valid bits 18 are set as each pixel enters the pipeline, or alternately, as each pixel is accessed in memory. Once the pipeline has finished writing the pixel to memory, valid bit 18 is cleared for the pixel. Pipeline 2 likewise has scoreboard table 22 with pixel addresses 16 and valid bits 18. Pipeline 2 must compare each pixel address 18 with a set valid bit 18 in pipeline 1's scoreboard table 20 with the pixel address of any new pixels. Pipeline 1 must likewise compare each new pixel with each valid pixel address in pipeline 2's table 22.

While such scoreboard tables are useful, many pixels can be processed at a time in a pipeline. Thus many pixel addresses may need to be stored. Larger triangles may require many pixel addresses. Many comparisons are needed, since each pixel is compared against every other pixel in the other pipeline. These comparisons require redundant comparator hardware, increasing cost, or additional delays when comparators are used multiple times.

Z-BUFFER DISABLED AND ALPHA-BLENDING MODES OF OPERATION

Sometimes the Z buffer is disabled because the application pre-sorted the triangles. Also, alpha blending may be enabled for translucent effects such as glass or smoke. If destination alpha is not provided in the device, a large, opaque background triangle may need to be rendered first, and then alpha-blended with smaller foreground triangles.

With the z-buffer disabled or the alpha blending enabled, parallel processing of triangles is more difficult. Overlapping triangles may not be processed in the intended order as a result of differences in processing rates in the Pixel Engines. Parallel processing may simply be disabled during these modes, but then performance is reduced. The Triangle Set-Up Engine may ensure that it does not allow out-of-order execution of triangles, but again performance is reduced. A more sophisticated but much more expensive method such as A-buffering may be used.

What is desired is a 3D graphics system that processes entire triangles in parallel. It is desired to process triangles in parallel to increase the degree of parallelism and increase performance. It is desired to coherently process triangles in parallel by ensuring that the same pixel is not accessed for depth resolution by both pipelines at the same time. It is desired to lock out a second triangle pixel-pipeline from accessing a pixel being updated by a first pipeline. It is further desired to reduce pixel comparisons for pipeline coherency. Parallel triangle processing during alpha-blending and anti-aliasing is also desired. It is desired to ensure that triangles are processed in the desired order by parallel triangle pixel-pipelines when the z-buffer is disabled.

SUMMARY OF THE INVENTION

A parallel-triangle-pipeline 3D graphics system has a triangle setup engine that is coupled to receive triangle primitives representing three dimensional 3D objects on a display screen. It generates attributes for three vertices and attribute gradients of the triangle.

A first triangle pixel-pipeline is coupled to receive vertex attributes and surface gradients of a first triangle from the triangle setup engine. It generates pixel colors for pixels within the first triangle. The first triangle pixel-pipeline writes the pixel colors to a frame buffer for display on the display screen.

A second triangle pixel-pipeline is coupled to receive vertex attributes and surface gradients of a second triangle from the triangle setup engine. It generates pixel colors for pixels within the second triangle. The first triangle pixel-pipeline writes the pixel colors to a frame buffer for display on the display screen.

A plurality of first partial-pixel-address registers is coupled to the first triangle pixel-pipeline. Each register stores a Y address indicating a scan line on the display screen and a partial X address indicating a span-range of pixels within the scan line. The first triangle pixel-pipeline accesses a pixel in the frame buffer within the span-range.

Pixel coherency means is coupled to the plurality of first partial-pixel-address registers for the first triangle pixel-pipeline and is coupled to the second triangle pixel-pipeline. It compares a Y address and a partial X address for a requested pixel in the frame buffer to be accessed by the second triangle pixel-pipeline to the Y addresses and a partial X addresses stored in the plurality of first partial-pixel-address registers. The second triangle pixel-pipeline is prevented from accessing the requested pixel in the frame buffer when the requested pixel is in a span-range stored during depth resolution in the first partial-pixel-address registers.

Thus two triangle pixel-pipelines receive vertices, attributes, and attribute gradients for two triangles processed in parallel. Frame-buffer coherency is provided during depth resolution by comparing partial pixel addresses for a span-range of pixels on a scan line.

In further aspects of the invention, attributes and gradients of attributes with respect to X and Y coordinates are generated by the triangle setup engine and sent to the first or second triangle pixel-pipeline with the vertices.

In further aspects of the invention the first and second triangle pixel-pipeline each further have setup registers loaded by the triangle setup engine with vertex attributes and attribute gradients for the triangle. A span engine receives the three vertices from the setup registers. It generates endpoints for spans. The endpoints are intersections of horizontal scan lines on the display screen with edges of the triangle. A raster engine receives an endpoint for a span. It generates pixel colors for pixels along a span within the triangle. The raster engine writes the pixel color to the frame buffer when the pixel coherency means determines that the pixel does not fall within a span-range in use for depth resolution by another triangle pixel-pipeline. Thus each triangle pixel-pipeline generates span endpoints and rasterizes pixels within a triangle.

In still further aspects of the invention the first and second triangle pixel-pipeline each also have a first-in-first-out FIFO buffer that is coupled between the span engine and the raster engine. It stores endpoints from the span engine until the raster engine is available to rasterize a new span.

In further aspects of the invention the plurality of first partial-pixel-address registers also have valid registers for indicating when the Y address and the partial X address in a register are valid. A valid registers is set when the first pipeline's depth resolution logic requests an access of a first pixel in the span-range identified by the partial X address. The valid register is cleared when all pixels in the span-range have been depth resolved by the first triangle pixel-pipeline. The second triangle pixel-pipeline is prevented from accessing the requested pixel in the frame buffer only when the requested pixel is in a span-range stored by the depth resolution logic in the first partial-pixel-address registers having a set valid register. Thus the partial-pixel-address registers are validated.

In other aspects each span range contains $2^N$ pixels. A lower N bits of an X address for a pixel are not compared by the pixel coherency means, wherein N is at least 2. Span-ranges are aligned to multiples of $2^N$ bytes of pixels.

DETAILED DESCRIPTION

The present invention relates to an improvement in 3D graphics. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that parallel triangle rendering is more efficient than parallel pixel or span processing since a larger group of pixels are processed in parallel. Setup of the pipelines is minimized since only the three vertices of the triangle needs to be sent to a triangle pixel-pipeline. Each pipeline receives color, texture and other attributes for only the starting values and the gradients (slopes), but each pipeline outputs color and depth for each pixel in the triangle.

The inventors have further realized that a triangle pixel-pipeline processes a contiguous number of pixels in the triangle. Thus many adjacent pixels are processed at the same time. Pixel memory is read and written for these adjacent pixels at about the same time.

Rather than store pixels addresses for each individual pixel in the triangle, a range of pixel addresses can be stored in the scoreboard. Comparison of a new pixel is made to a range of pixels along a span or even a tile, rather than to individual pixels. Thus compare requirements are significantly reduced.

The triangle pixel-pipeline processes pixels in the triangle span by span. The tendency is therefore that pixels being accessed in memory are from a same span or horizontal line on the screen. Thus only a range of the horizontal (x) address is compared, not a range of the vertical (y) address. The number of entries in the scoreboard table is also reduced, since only one or a few entries are required for each span in the triangle being processed. Since only one or two spans may be processed at a time by a pipeline, only a few entries are needed.

When the z-buffer is disabled, the processing order of the triangles is maintained by performing an additional compare. A bounding box around a triangle is compared with a bounding box around a triangle in another pipeline to ensure that overlapping triangles are not processed in parallel. Using a bounding box rather than the exact shape of the triangle simplifies the comparison. More exact methods, such as clipping, may be used at an increase in performance but also cost.

PARALLEL TRIANGLE PIXEL-PIPELINES—FIG. 3

Figure 3:
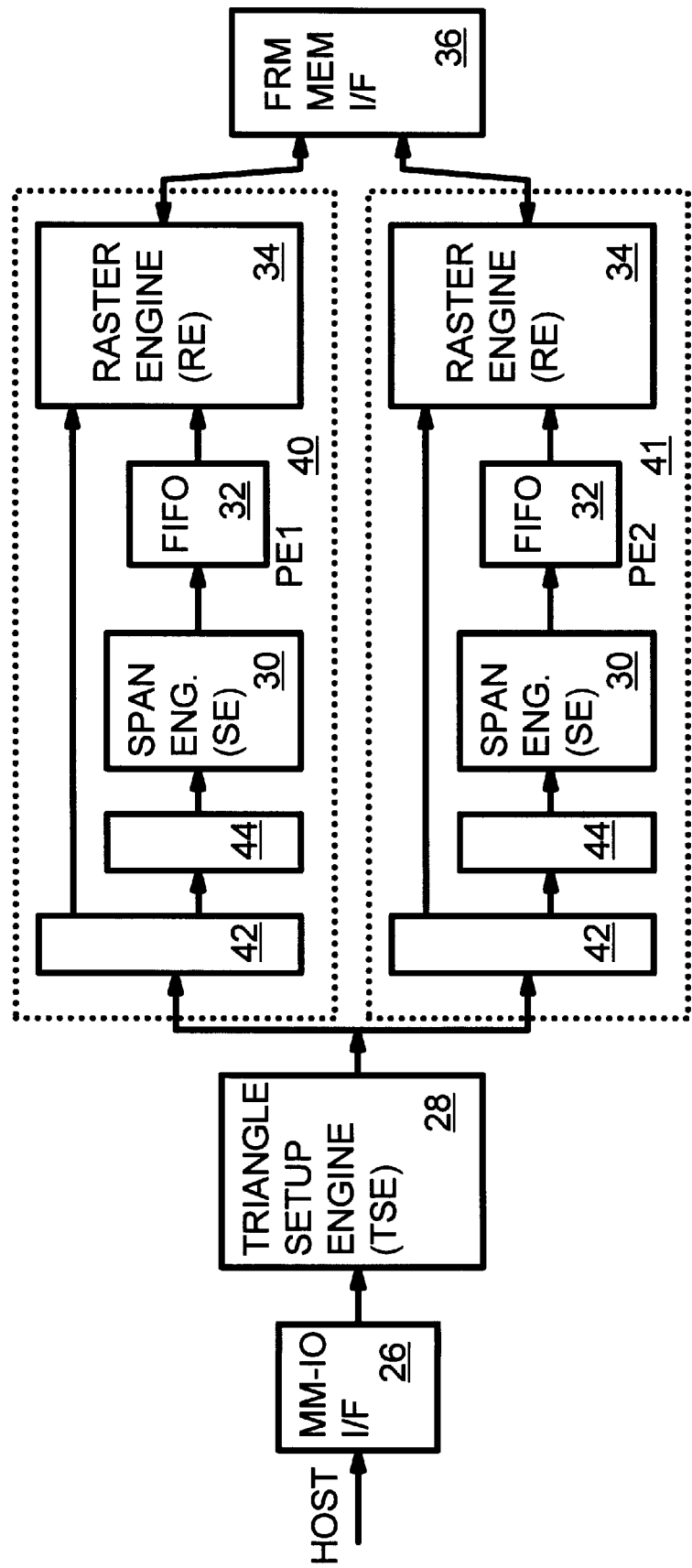
FIG. 3 is a diagram of a 3D graphics subsystem with parallel triangle pixel-pipelines.

FIG. 3 is a diagram of a 3D graphics system with parallel triangle pixel-pipelines. A host such as an operating system API executing the geometry processing on a PC microprocessor sends the vertices of triangles to triangle setup engine 28 through memory-mapped 10 interface 26. Alternatively, a hardware accelerated Geometry Engine may supply the same. Gradients or slopes of all attributes within a triangle are calculated by triangle setup engine 28 from the vertex values.

Once a triangle is setup by triangle setup engine 28, its gradients and vertices are sent to the next available triangle pixel-pipeline(s) 40, 41. Triangle pixel-pipelines 40, 41 are each pixel engines (PE) that receive the three vertices for a triangle and the gradients with respect to the x and y axis of attributes within the triangle. Triangle pixel-pipelines 40, 41 output pixel R,G,B values or perform a read-modify-write cycle of the pixels in frame buffer through frame-buffer interface 36. Hundreds or thousands of pixels within a triangle are generated from the three vertices input to triangle pixel-pipelines 40, 41. Thus the pipeline structure is highly efficient as only 3 data points and gradient values may generate hundreds of pixels.

Each triangle pixel-pipeline 40, 41 can process a separate triangle, allowing two triangles to be processed at the same time. Of course, one triangle may be larger or more complex than the other, allowing many smaller triangles to be processed by the second pipeline while the large triangle is being processed by the first pipeline. Each triangle pixel-pipeline 40, 41 contains span engine (SE) 30 and raster engine (RE) 34. Span engine 30 generates the edges of the triangle from the three vertices received from triangle setup engine 28. The endpoints of each intersecting horizontal scan line are also generated. Raster engine 34 generates the pixels along a horizontal span within the triangle. FIFO 32 buffers the endpoints from span engine 30 to raster engine 34. This process of generating span endpoints is known as triangle edge walking (see appendix for more details).

Register 42 stores triangle attributes written by triangle setup engine 28, such as the vertices and gradients of the colors and texture attributes. Register 44 stores the x,y-type data. Registers 42, 44 include shadow and active registers.

Triangle pixel-pipelines 40, 41 are allowed to process triangles that overlap when the z-buffer is enabled, since z-buffering allows the triangles to be processed in any order.

However, the same pixel cannot be accessed by both triangle pixel-pipelines 40, 41 at the same time. An interlock mechanism is used to stall a pipeline trying to access a pixel being processed by the raster engine in the other pipeline. Since pixels are only read or written to the frame buffer by raster engines 34, it is only pixels in the span currently being processed by raster engines 34 that must be compared. Span engines 32 can operate without regard to the other pipeline since they do not read or write the frame-buffer pixels.

SPAN-RANGE CHECKING–FIGS. 4A, 4B

Figure 1:
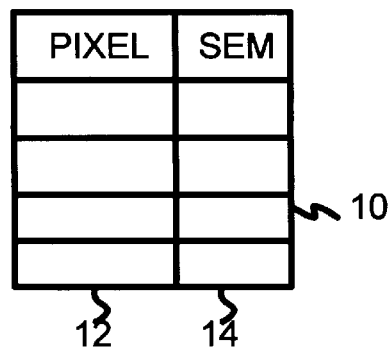
FIG. 1 shows semaphores for pixels in a 3D parallel processor.
Figure 2:
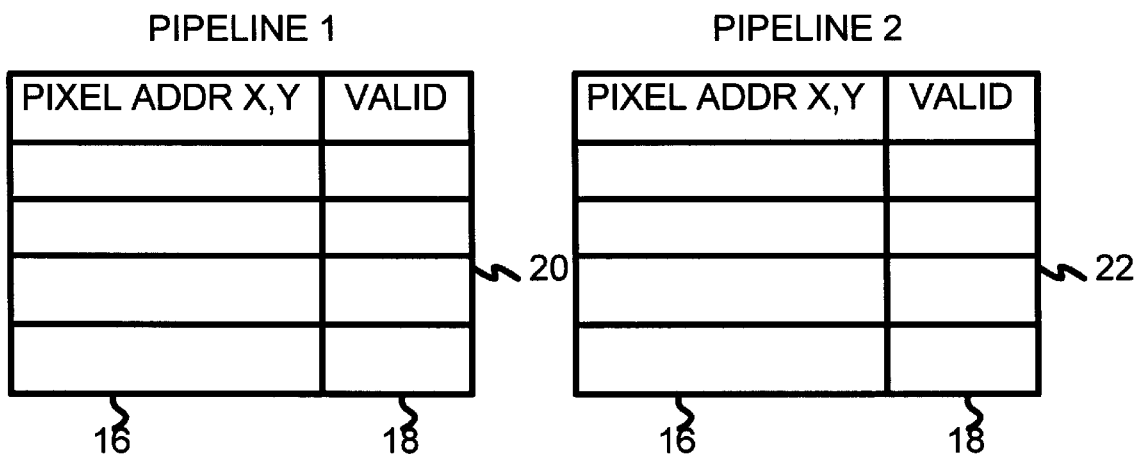
FIG. 2 illustrates a scoreboard method for pixel-access coherency for parallel triangle pixel-pipelines.
Figure 4A:
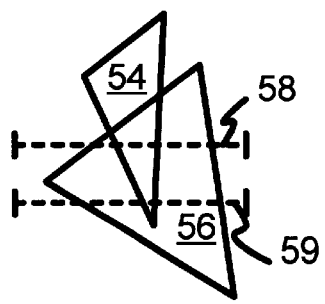
FIGS. 4A, 4B illustrate span-range checking for pixel-memory coherency with parallel pipelines.
Figure 4B:
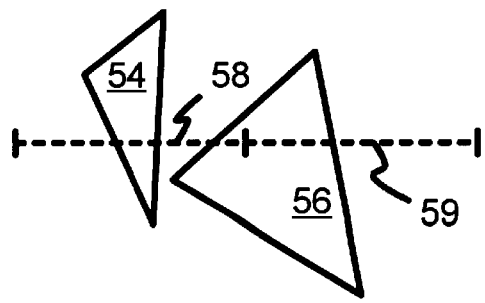

FIGS. 4A, 4B illustrate span-range checking for pixel-memory coherency with parallel pipelines. Rather than compare single pixels being processed in parallel by each pipeline, a range of pixels is compared. The range of pixels include only adjacent pixels along a span being rasterized.

In FIG. 4A, triangle 54 is being processed by triangle pixel-pipeline 40 while triangle 56 is being processed by triangle pixel-pipeline 41. Triangles 54, 56 overlap, but are allowed to be processed at the same time by the two pipelines as long as the same range of pixels in a same horizontal line are not processed by both pipelines at the same time. To prevent this, a comparison is made of new pixels in the FIFO of one pipeline to a range of pixels being generated in the other pipeline.

Pipeline 40 is rasterizing pixels in span-range 58, while pipeline 41 is preparing to rasterize pixels in span-range 59. Since span ranges 58, 59 are in different horizontal lines, even though the x ranges match, no pixel overlap is detected. Rasterization is allowed to continue. Span-ranges 58, 59 are a fixed width, being perhaps 32 or 64 pixels wide. Span-ranges 58, 59 are also aligned to a power of 2, so that their endpoints are multiples of 32 or 64.

In FIG. 4B, triangles 54, 56 do not overlap. However, their span-ranges overlap, so rasterization of one triangle must stall until the other pipeline finishes rasterizing the overlapping spans. Triangle 54 is rasterizing pixels within span-range 58. Triangle 56 is preparing to rasterize pixels on a horizontal line that includes span-ranges 58, 59.

Since triangle 56 is either wider than a single span-range, or crosses a boundary between two span-ranges, two span-ranges 58, 59 must be checked. Span-range 58 intersects both triangles 54, 56, even though triangles 54, 56 do not themselves overlap. The overlap of span-range 58 prevents the pipeline processing triangle 56 from continuing on this span. Another span may be rasterized, or the pipeline can stall until span-range 58 is completed by the other pipeline processing triangle 54.

Thus the span-ranges are compared before rasterizing the pixels along a span in a triangle. When a span-range is in use by another pipeline, rasterization of the span must stall until the span-range's rasterization of another triangle is completed in the other pipeline.

SPAN-RANGE CHECKER—FIG. 5

Figure 5:
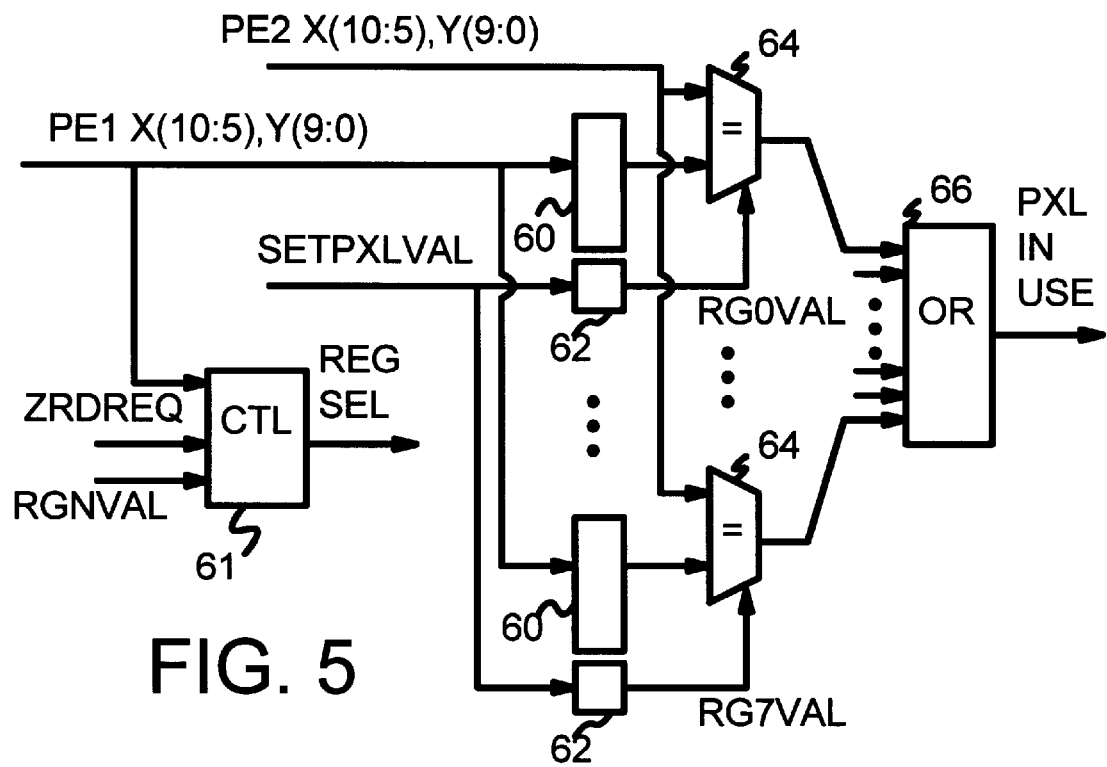
FIG. 5 is a diagram of a span-range checker for pixels in parallel triangle pixel-pipelines.

FIG. 5 is a diagram of a span-range checker for pixels in parallel triangle pixel-pipelines. Pixel addresses from the two pipelines PE2, PE1 are designated X(10:5), Y(9:0) and include a 10-bit scan-line address Y(9:0) that indicates which of 1024 horizontal lines on the screen the pixel is on. Only the most-significant 6 bits of the 11-bit pixel X address is included. The least-significant 5 bits X(4:0) indicate the pixel's location within a span-range. Each span-range has 32 pixels and has boundaries aligned to multiples of $2^5$. Other span-range sizes re practical depending on the size of the buffers to or from memory.

The 16-bit pixel address from pipeline 2 (PE2) is compared to up to seven previous pixel addresses for pipeline 1 (PE1). The pipeline-1 addresses PE1 are latched into one of seven address registers 60. When a valid bit in a corresponding valid registers 62 is set, the comparator 64 connected to the valid register 62 is enabled. Each of the seven address registers 60 is validated and each of the seven comparators 64 is enabled by setting the valid bits in the seven valid registers 62. Control logic 61 generates a register-select signal REG_SEL that allows the valid-bit set signal SELPXLVAL to set one of the seven valid bit registers 62. The valid register 62 is set when the raster engine of pipeline 1 requests using ZRDREQ to read a pixel in a new span-range.

When the current pipeline-2 pixel address PE2 matches one of the latched pipeline-1 addresses from address registers 60, with valid register 62 set, one of the comparators 64 signals a match. OR gate 66 generates a PXL_IN_USE signal to pipeline 2. Pipeline 2 must hold until pipeline 1 finishes rasterizing the span-range and invalidates the matching address register. The register is invalidated upon writing the pixels' z values to memory or upon determining that the pixel(s) are hidden. However, more frequently, new addresses are replacing old ones.

Another comparator can be used to compare the last pixel address from pipeline 1 to the current pixel address. Once all 32 pixels have been processed, a new span-range is entered and the MSBs of the PE1 X address change. Control logic 61 is then signaled to latch the new span-range address in the next available register.

A second span-range checker circuit is used for comparing the current pixel address from pipeline 1 to latched span-range addresses for pipeline 2. This complementary circuit merely reverses the connection for pipelines 1 and 2. In order to avoid deadlock caused by the simultaneous occurrence of PxlInUse in both pipes, one of the pipes must take precedence.

SORT-DEPENDENT ALPHA-BLENDING AND Z-BUFFER TURNED-OFF RENDERING MODES

One common special effect is alpha-blending, where translucent triangles attenuate background triangles as in glass or smoke. The attenuation is expressed as a blend function and requires front-to-back ordering of surfaces effected by translucency. Anti-aliasing is somewhat similar, except that only the edges of the object are blended. The alpha value for each triangle or vertex indicates what percent or weighting of the triangle should be included in the final rendered triangle.

Normally, the z-buffer effectively resolves the depth-order of triangles after they are rendered, as depth (z) values for each screen pixel are compared to previously stored z-values and written to the z-buffer if found visible. However, blending requires that the rendering engine know which triangles are the foreground and background objects. The triangles may first be depth-sorted by the PC's microprocessor before the triangle setup engine sends the triangles to the triangle pixel-pipelines in the sorted order. The pre-sorting ensures that the opaque background triangles are rendered first. Then alpha-blending mode is enabled so that the foreground triangles processed next are blended into the already-written background pixels. Read-modify-write accesses of the background-triangle pixels in the frame buffer may be used for alpha blending.

For proper alpha blending, the parallel triangle pixel-pipelines must process the triangles in the order specified in the pre-sorting by the microprocessor. The triangle setup engine sends the triangles to the triangle pixel-pipelines in that order, but because the size of triangles differ, it is possible that one pipeline with a larger background triangle gets overtaken by a smaller foreground triangle in the other pipeline. This must be avoided.

One of the pipelines could simply be disabled for alpha-blending mode. However, the inventors have devised a simple comparison to avoid overlapping triangles. The triangle in one pipeline is compared to the triangle in the other pipeline, and one pipeline is stalled if an overlap occurs. Since the triangle setup engine loads triangles in the proper order into the pipelines, and can only load one pipeline at a time, any overlap detected occurs as the foreground triangle is being loaded. The newly-loaded triangle pixel-pipeline is then held until the other pipeline completes the background triangle.

A comprehensive solution to detecting overlapping triangles is the clip test. In the clip test, each vertex of one triangle is compared with the planes represented by the edges of the other triangle. The clip test involves computing the distances from each plane to the vertex of interest. The signs of the distances indicate which side of the edge the vertex is on and therefore determine whether the vertex is inside the other triangle and an overlap is detected. The computations for the clip test are rather lengthy and expensive.

Rather than use the clip test, a less exact bounding-box test is used. The bounding box test may detect false overlaps, but is much simpler to implement. The false overlaps generally constitute a very small percentage of the total pixel fill-rate, making this approach an excellent price/performance choice.

BOUNDING BOX FOR DETECTING OVERLAPPING TRIANGLES—FIGS. 6A–C

Figure 6A:
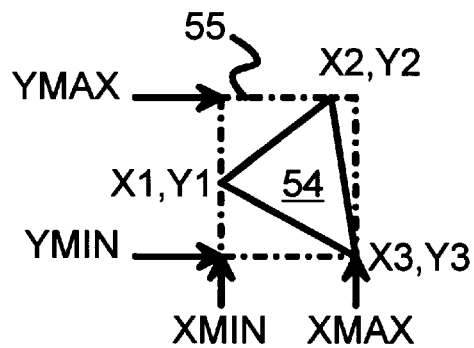
FIGS. 6A–C illustrate bounding boxes used to detect when triangles overlap for stalling a pipeline when the z buffer is disabled.
Figure 6B:
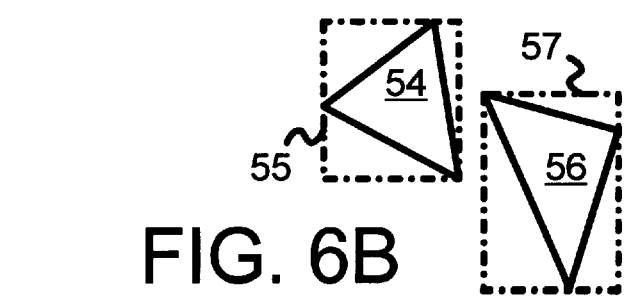
Figure 6C:
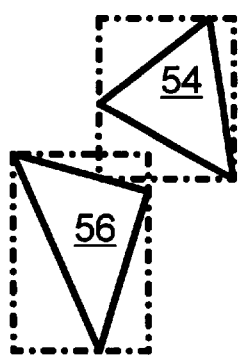

FIGS. 6A–C illustrate bounding boxes used to detect when triangles overlap for stalling a pipeline when the z buffer is disabled. In FIG. 6A, triangle 54 has three vertices with coordinates (X1,Y1), (X2,Y2), and (X3,Y3). The maximum and minimum X and Y values of the three vertices are determined. The maximum Y, YMAX, is the largest of Y1, Y2, Y3 (Y2 in the example of FIG. 6A), while the minimum Y, YMIN, is the smallest of Y1, Y2, Y3 (Y3 in the example). Similarly, the maximum X, XMAX, is the largest of X1, X2, X3 (X3 in the example of FIG. 6A), while the minimum X, XMIN, is the smallest of X1, X2, X3 (X1 in the example).

Bounding box 55 is the rectangular box that completely encloses triangle 54. Its four edges are defined by XMIN, YMIN, XMAX, and YMAX. Bounding box 55 is used as an approximation of triangle 54 for determining overlap for stalling the pipeline. Since bounding box 55 covers more area that triangle 54, more pipeline stalls are generated than if triangle 54 were used for determining actual overlaps. However, the calculational complexity saved using bounding boxes rather than the more exact clip test is significant.

FIG. 6B shows triangles with non-overlapping bounding boxes. Triangles 54, 56 do not overlap, and their bounding boxes also do not overlap. Thus triangles 54, 56 can be rasterized in parallel in two triangle pixel-pipelines. Only when span-ranges overlap will a pipeline stall be needed, and then only the raster engine (RE), not the whole triangle pixel-pipeline is held. Of course, when triangles 54, 56 overlap, their bounding boxes also must overlap.

FIG. 6C shows non-overlapping triangles with overlapping bounding boxes. Although triangles 54, 56 do not overlap, their bounding boxes 55, 57 overlap. When triangle 54 is already being processed in one of the triangle pixel-pipelines, triangle 56 cannot be loaded into the other pipeline. Another triangle may be loaded, or the other pipeline held until triangle 56 finishes. The triangle may be allowed to proceed through the early part of the triangle pixel-pipeline, such as the span engine, but be held at the first pixel read in the raster engine.

The bounding boxes may be reduced in size or depleted as spans are rasterized. For example, as the upper spans are rasterized and completed, the YMAX value can be reduced to point to the next uncompleted span in the triangle. This reduced the delay for pipeline stalls since second triangles that overlap near the top of the first triangle can proceed before the entire first triangle is rasterized.

Opaque triangles are not alpha-blended and thus may safely be processed in parallel with other triangles, even overlapping triangles. The pipeline stall logic can detect opaque triangles by reading the alpha source and blend mode texture registers for the triangle.

BOUNDING-BOX OVERLAP DETECTOR—FIG. 7

Figure 7:
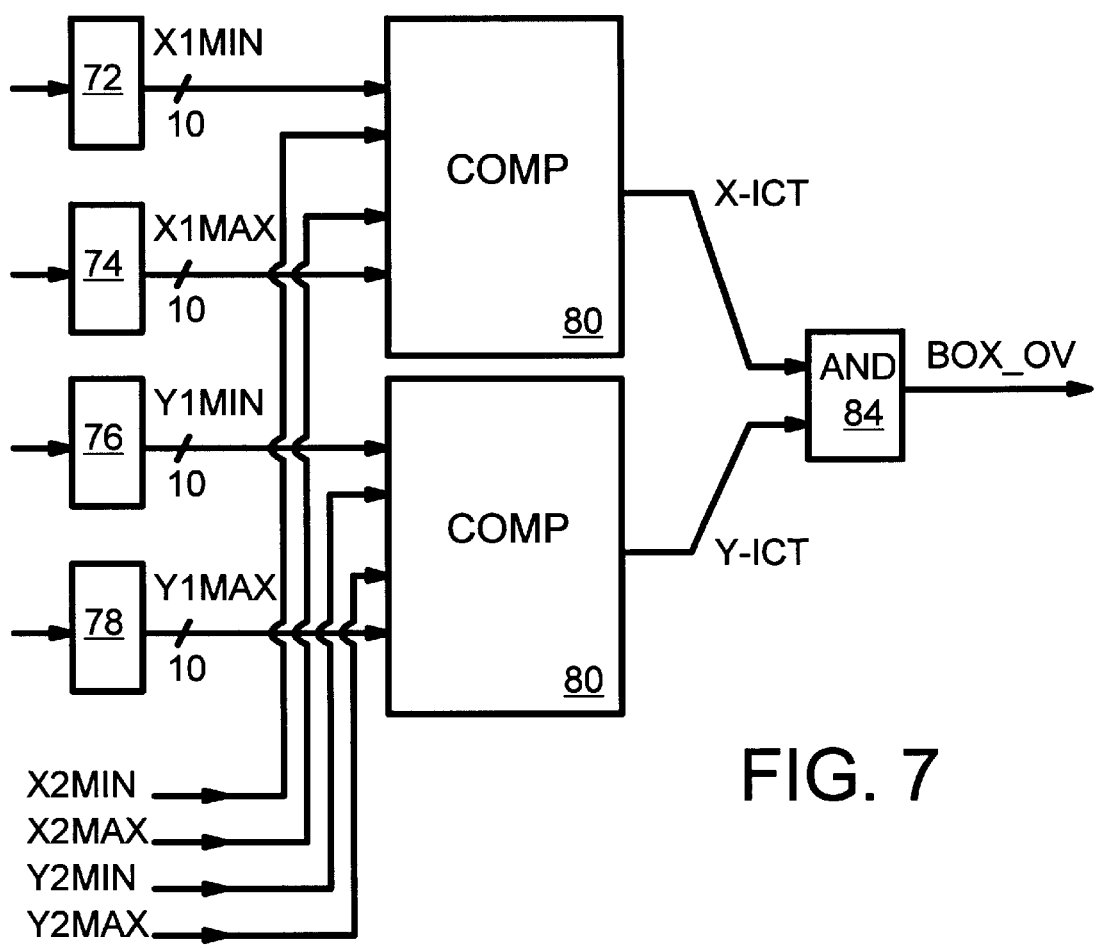
FIG. 7 is a diagram of a circuit for detecting when bounding boxes of triangles overlap.

FIG. 7 is a diagram of a circuit for detecting when bounding boxes of triangles overlap. The XMIN, XMAX, YMIN, and YMAX values for pipeline 1 (X1MIN, X1MAX, Y1MIN, Y1MAX) are latched into registers 72, 74, 76, 78, while the X2MIN, X2MAX, Y2MIN, and Y2MAX values for pipeline 2 are sent directly to compare blocks 80. The X and Y MIN and MAX values are 11-bit values for screen resolutions of up to 2 K by 2 K.

Compare blocks 80 determine when the X or Y MIN and MAX values of the two bounding boxes overlap. The upper compare block 80 compares X values while the lower compare block 80 compares Y values. When both X and Y overlaps are detected, both compare blocks 80 activate their intersected outputs (X-ICT, Y-ICT), causing AND gate 84 to signal BOX_OV, indicating that a box overlap is detected.

For X, and overlap is detected when X2MIN is between X1MAX and X1MIN, or when X2MAX is between X1MAX and X1MIN. Dual-input comparators are used, so the operation performed by compare block 80 for X is [(x2min>=x1min) and (x2min <=x1max)] OR [(x2max>= x1min) and (x2max<=x1max)]. A similar operation is performed for Y.

DETAIL OF COMPARE BLOCK—FIG. 8

Figure 8:
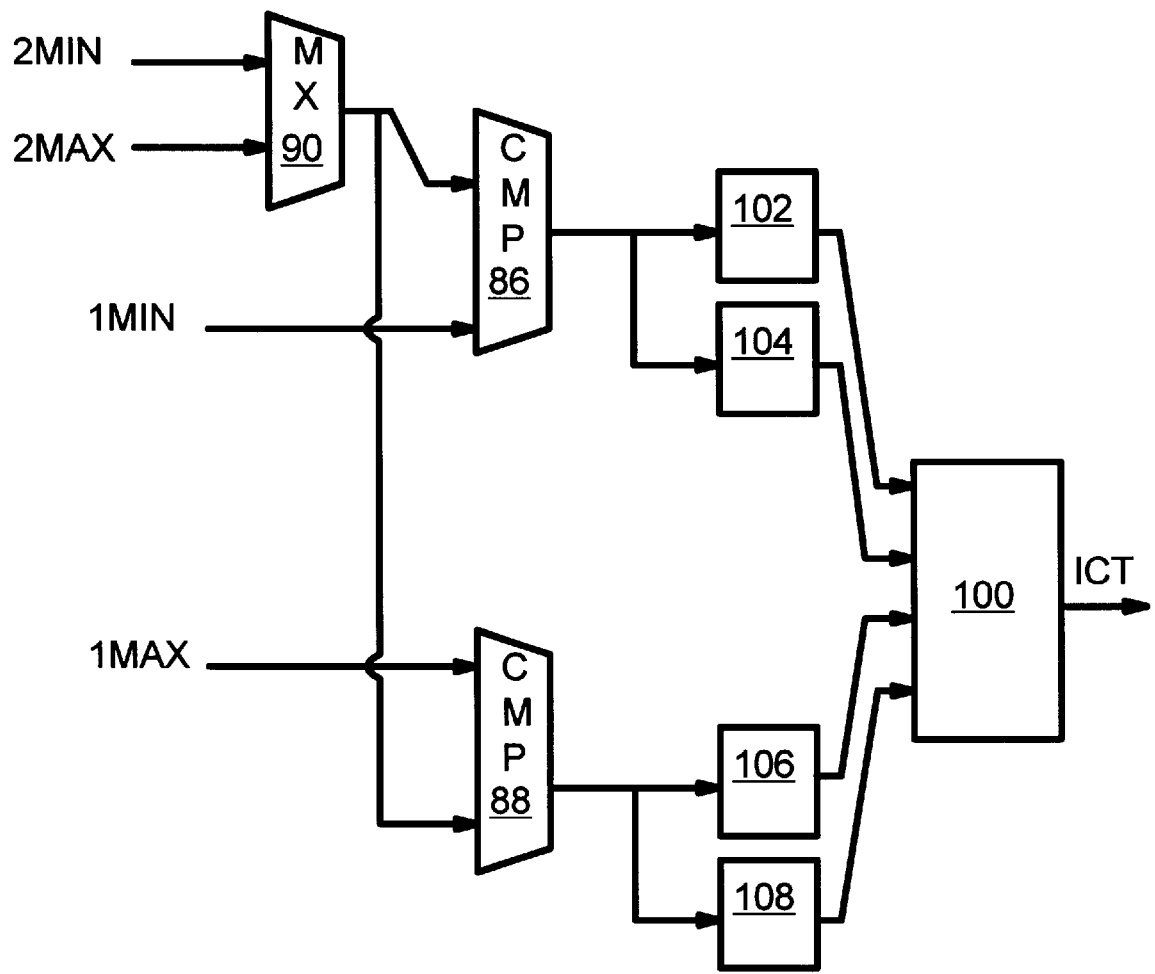
FIG. 8 is a detailed diagram of the compare block of FIG. 7.

FIG. 8 is a detailed diagram of the compare block of FIG. 7. Compare block 80 performs four comparisons of two inputs per compare. While four separate comparators could be used to perform the full operation in one clock period, the inventor uses only two comparators that are time-multiplexed. Two compare operations are performed in a first clock cycle by comparators 86, 88 and their results stored in registers 102, 106. Then in the next clock cycle comparators 86, 88 are used again with different inputs selected by mux 90 and their results stored in registers 104, 108.

Comparator 86 is performs a greater-than-or-equal-to X1MIN operation while comparator 88 performs a less-than-or-equal-to X1MAX operation on the output from mux 90. Mux 90 selects X2MIN the first clock cycle and X2MAX the second cycle.

AND-OR gate 100 generates the intercepted output ICT when registers 102, 106 are both high, or when registers 104,

108 are both high. Register 102 holds the result x2min>= x1min, register 104 the result x2max>=x1min, register 106 the result x2min<=x1max, and register 108 the result x2max<=x1max.

ADVANTAGES OF THE INVENTION

A 3D graphics system rasterizes entire triangles in parallel. Triangles are processed in parallel to increase the degree of parallelism and increase performance. Triangles are processed with pixel-memory coherency to ensure that the same pixel is not accessed for depth-resolution by both pipelines at the same time. A second triangle pixel-pipeline is locked out from accessing a pixel being updated by a first pipeline. Pixel comparisons for pipeline coherency are reduced. Parallel triangle processing is also possible during sort-dependent alpha-blending and anti-aliasing with the invention. Triangles are processed in the desired order by parallel triangle pixel-pipelines when the z buffer is disabled.

Parallel triangle rendering may be more efficient than parallel pixel or span processing since a larger group of pixels are processed in parallel. Superior load-balancing is achieved. Parallel pixel or span processing results in idle time in one or the other pipe. Setup of the pipelines is minimized since only the three vertices of the triangle needs to be sent a triangle pixel-pipeline. Each pipeline receives color and texture for only the 3 vertices and the gradients (slopes), but each pipeline outputs color for each pixel in the triangle. Thus the interface to a triangle pixel-pipeline is minimal.

A triangle pixel-pipeline processes a continuous line of pixels for each span in the triangle. Thus many adjacent pixels are processed at the same time. Pixel memory is read and written for these adjacent pixels at about the same time. Rather than store pixels addresses for each individual pixel in the triangle, a range of pixel addresses can be stored in the scoreboard. Comparison of a new pixel is made to a range of pixels along a span, rather than to individual pixels. Thus compare requirements are significantly reduced.

The number of entries in the scoreboard table is also reduced, since only one or a few entries are required for each span in the triangle being processed. Since only one or two spans may be processed at a time by a pipeline, only a few entries are needed.

During sort-dependent modes such as when the z-buffer is disabled or during alpha-blending or anti-aliasing, the processing order of the triangles is maintained by performing an additional compare. A bounding box around a triangle is compared with a bounding box around a triangle in another pipeline to ensure that overlapping triangles are not processed in parallel. Bounding-box comparisons are much simpler to implement in hardware than the more accurate clip test.

ALTERNATE EMBODIMENTS

Several other embodiments are contemplated by the inventors. A tile based, rather than a span based, memory organization and/or rendering is contemplated using a pixel-range (or tile-range—in both x and y) scoreboard mechanism. For example, instead of comparing a single y address and a range of 32 pixels in x, the tile organization may compare 4 y addresses (4 lines) and a range of 8 pixels in x. Various implementations of the graphics accelerator hardware are possible. The triangle pixel-pipelines can be separate from the graphics accelerator or integrated onto the same silicon substrate as the graphics accelerator. Polygons other than triangles can be used as drawing primitives with the invention. Higher screen resolutions with more lines can use a larger Y address. Additional parallel triangle pixel-pipelines may be added along with additional partial-pixel address compare circuits.

Additional buffers or FIFO's can be added to allow portions of each triangle pixel pipeline to operate at slightly different momentary rates as well as to allow the overlapping of triangle rendering within the pipe. This overlap will require the repetition of the synchronization mechanism at each independent overlapping triangle pixel pipeline segment. Alternatively, multiple parallel set-up engines and/or multiple parallel geometry engines may drive the triangle pixel pipelines. The inputs to the graphics accelerator can use separate busses or can share a bus to the processor, such as a shared PCI or advanced-graphics-port (AGP) bus. Other circuit implementations of the bounding-box and span-range overlap detectors are possible.

Other 3D effects can be used with the invention. Anti-aliasing removes jagged lines at the edge of a polygon by blending pixels at the edge of the polygon. The polygon's color is blended with a background color so that the polygon's edge gently blends into the background rather than abruptly changes. For fog, the blending factor of each pixel with the fog color is a function of the fog distribution and the adjusted distance of the pixel to the viewer. Various functions may be used to reconstruct the texture function such as linear, bilinear, trilinear or cubic interpolation. Various texture blend functions may be used to 'nix' the texture color with the iterated color. Various multi-texture blend functions may be used to enhance the material type and environmental effects visualization experience such as detailed maps, bump maps and environment maps. Various alpha blend functions may be used to enhance the effects of translucent surfaces or objects.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX—DETAILS OF TRIANGLE EDGE AND SPAN WALKING

More details of the exemplary equations implemented by the span and raster engines for triangle edge and span walking with attribute interpolation are given in this section. See also the co-pending application for "3D Triangle Rendering by Texture Hardware and Color Software Using Simultaneous Triangle-Walking and Interpolation for Parallel Operation", U.S. Ser. No. 08/928,291, filed Sept. 12, 1997, now U.S. Pat. No. 6,016,151.

Assume that gradients of x with respect to y for the three edges of the triangle are:

X1y, X2y, X3y.

The height in y from the top vertex to the middle vertex is H1 while the height from the middle vertex to the bottom vertex is H2. For edge walking to determine the x,y coordinates of the endpoints of each horizontal line or span, the x,y or the top vertex, H1, H2, and X1y, X2y, X3y are sent from the CPU as starting values.

For span walking and color interpolation, the gradients of R, G, B, Z, alpha $\alpha$, etc. with respect to x and y are also needed from the CPU software:

Rx, Gx, Bx, Zx, $\alpha$x, etc.

Their gradients with respect to y are:

Ry, Gy, By, Zy, αy, etc.

Edge walking starts from the top vertex, at coordinate (X0, Y0) with color attribute values of R0, G0, B0, Z0, A0, etc.

Step 1. Increment y: Y0+1

Calculate the left-edge endpoint of the first span:
x: X0+X1y (X1y is negative in this example)

Calculate right-edge endpoint
x: X0+X3y

Calculate left-edge R color attribute:
R=R0+(Ry+X1y·Rx)

Similarly, calculate other values for G,B,Z,α, etc.

Step 2. Start from X+X0+X1y:
X=X+1, ..., until X reaches X0+X3y.

For each X, calculate the new R by adding Rx to the old R:
R=R+Rx, ...

Step 3. Increment y:
Y0+1+1

Calculate left edge x:
X0+X1y+X1y

Calculate right edge x:
X0+X3y+X3y

Calculate left edge R:
R+R0+(Ry+X1y·Rx)+(Ry+X1y·Rx)

Similarly, calculate other values ...,

Step 4. Start from X=X0+X1y+X1y:
X=X+1, ..., until X reaches X0+X3y+X3y

For each X, calculate the new R by adding Rx to old R:
R=R+Rx, ...

Similar calculations are performed for Steps 5–8. Then X2y is used instead of X1y for Steps 10–12.

We claim:

1. A parallel-triangle-pipeline 3D graphics system comprising:

a triangle setup engine, coupled to receive triangle primitives representing three-dimensional 3D objects on a display screen, for generating attributes for three vertices and attribute gradients of the triangle;

a first triangle pixel-pipeline, coupled to receive vertex attributes and surface gradients of a first triangle from the triangle setup engine, for generating pixel colors for pixels within the first triangle, the first triangle pixel-pipeline writing the pixel colors to a frame buffer for display on the display screen;

a second triangle pixel-pipeline, coupled to receive vertex attributes and surface gradients of a second triangle from the triangle setup engine, for generating pixel colors for pixels within the second triangle, the first triangle pixel-pipeline writing the pixel colors to a frame buffer for display on the display screen;

a plurality of first partial-pixel-address registers, coupled to the first triangle pixel-pipeline, each register for storing a Y address indicating a scan line on the display screen and a partial X address indicating a span-range of pixels within the scan line, wherein the first triangle pixel-pipeline accesses a pixel in the frame buffer within the span-range; and pixel coherency means, coupled to the plurality of first partial-pixel-address registers for the first triangle pixel-pipeline and coupled to the second triangle pixel-pipeline, for comparing a Y address and a partial X address for a requested pixel in the frame buffer to be accessed by the second triangle pixel-pipeline to the Y addresses and a partial X addresses stored in the plurality of first partial-pixel-address registers;

wherein the second triangle pixel-pipeline is prevented from accessing the requested pixel in the frame buffer when the requested pixel is in a span-range stored during depth resolution in the first partial-pixel-address registers, whereby two triangle pixel-pipelines receive vertices, attributes and attribute gradients for two triangles processed in parallel and frame-buffer coherency is provided during depth resolution by comparing partial pixel addresses for a span-range of pixels on a scan line.

2. The parallel-triangle-pipeline 3D graphics system of claim 1 wherein attributes and gradients of attributes with respect to X and Y coordinates are generated by the triangle setup engine and sent to the first or second triangle pixel-pipeline with the vertices.

3. The parallel-triangle-pipeline 3D graphics system of claim 1 wherein the first and second triangle pixel-pipeline each further comprise:

setup registers loaded by the triangle setup engine with vertex attributes and attribute gradients for the triangle;

a span engine, receiving the three vertices from the setup registers, for generating endpoints for spans, the endpoints being intersections of horizontal scan lines on the display screen with edges of the triangle;

a raster engine, receiving an endpoint for a span, for generating pixel colors for pixels along a span within the triangle, the raster engine writing the pixel color to the frame buffer when the pixel coherency means determines that the pixel does not fall within a span-range in use for depth resolution by another triangle pixel-pipeline, whereby each triangle pixel-pipeline generates span endpoints and rasterizes pixels within a triangle.

4. The parallel-triangle-pipeline 3D graphics system of claim 3 wherein the first and second triangle pixel-pipeline each further comprise:

a first-in-first-out FIFO buffer, coupled between the span engine and the raster engine, for storing endpoints from the span engine until the raster engine is available to rasterize a new span.

5. The parallel-triangle-pipeline 3D graphics system of claim 3 wherein the plurality of first partial-pixel-address registers further comprise:

valid registers for indicating when the Y address and the partial X address in a register are valid, a valid registers being set when the first pipeline's depth resolution logic requests an access of a first pixel in the span-range identified by the partial X address, the valid register being cleared when all pixels in the span-range have been depth resolved by the first triangle pixel-pipeline;

wherein the second triangle pixel-pipeline is prevented from accessing the requested pixel in the frame buffer only when the requested pixel is in a span-range stored by the depth resolution logic in the first partial-pixel-address registers having a set valid register, whereby the partial-pixel-address registers are validated.

6. The parallel-triangle-pipeline 3D graphics system of claim 3 wherein each span range contains $2^N$ pixels and wherein a lower N bits of an X address for a pixel are not compared by the pixel coherency means, wherein N is at least 2.

7. The parallel-triangle-pipeline 3D graphics system of claim 6 wherein span-ranges are aligned to multiples of $2^N$ bytes of pixels.

8. The parallel-triangle-pipeline 3D graphics system of claim 7 wherein span-ranges for pixels in the first triangle include pixels outside the first triangle.

9. The parallel-triangle-pipeline 3D graphics system of claim 6 wherein N is 5 and wherein each span-range contains 32 bytes of pixels.

10. The parallel-triangle-pipeline 3D graphics system of claim 6 further comprising:
   a Z-buffer for storing depths for pixels in the frame buffer, wherein the Z-buffer is disabled for sort-dependent processing modes;
   first min/max registers, coupled to the first triangle pixel-pipeline, for storing a maximum X value, a minimum X value, a maximum Y value, and a minimum Y value of the three vertices of the first triangle; and
   a bounding-box checker, coupled to the first min/max registers, and receiving minimum and maximum X and Y values of the three vertices of the second triangle for the second triangle pixel-pipeline, for signaling a box overlap when the minimum or maximum X values of the second triangle fall between the minimum and maximum X values of the first triangle and the minimum or maximum Y values of the second triangle fall between the minimum and maximum Y values of the first triangle,
   whereby bounding boxes are compared for overlap when the Z-buffer is disabled or alpha-blending two triangles for translucent effects is enabled.

11. The parallel-triangle-pipeline 3D graphics system of claim 10:
   wherein the second triangle pixel-pipeline is prevented from accessing the requested pixel in the frame buffer when the box overlap is signaled and sort-dependent processing is enabled.

12. The parallel-triangle-pipeline 3D graphics system of claim 11 wherein the box overlap is not signaled for an opaque triangle even when bounding boxes overlap.

13. The parallel-triangle-pipeline 3D graphics system of claim 11 wherein sort-dependent processing is enabled for anti-aliasing when edges of a second triangle are blended with a background first triangle, wherein the bounding-box checker signals the box overlap for anti-aliasing.

14. A triangle-pipeline interlock comprising:
   a pixel span-range checker, receiving a first partial address of a pixel from a first triangle pixel-pipeline and a second partial address of a pixel from a second triangle pixel-pipeline, for signaling a pixel conflict when the first partial address matches the second partial address;
   wherein the partial addresses include a full scan-line address uniquely identifying one scan line of a plurality of horizontal scan lines on a display screen, the partial addresses also including a partial sub-line address, the partial sub-line address indicating a range of pixels within the scan line;
   a bounding-box checker, receiving horizontal and vertical minimum and maximum coordinates of vertices of a first triangle in the first triangle pixel-pipeline and receiving horizontal and vertical minimum and maximum coordinates of vertices of a second triangle in the second triangle pixel-pipeline, for signaling a box overlap when bounding boxes defined by the horizontal and vertical minimum and maximum coordinates of the first and second triangles overlap;
   wherein the pixel conflict signaled by the pixel span-range checker holds a triangle pixel-pipeline from reading a pixel's depth value in a shared depth memory that is being accessed by the other triangle pixel-pipeline; and
   wherein the box overlap signaled by the bounding-box checker holds a triangle pixel-pipeline from reading a pixel in a shared memory that is being accessed by the other triangle pixel-pipeline when a sort-dependent rendering mode is enabled,
   whereby pixel span-ranges are checked for memory coherency, but bounding-box overlap is checked for sort-dependent rendering modes.

15. The triangle-pipeline interlock of claim 14 wherein the box overlap is signaled when bounding boxes of the first and second triangles overlap, even when the first and second triangles do not overlap,
   whereby box overlap is less exact than triangle overlap.

16. The triangle-pipeline interlock of claim 15 wherein the pixel span-range checker further comprises:
   a plurality of comparators for comparing a plurality of the first partial addresses for the first triangle pixel-pipeline to the second partial address,
   whereby many partial addresses are compared for many ranges of pixels.

17. The triangle-pipeline interlock of claim 16 wherein the pixel span-range checker further comprises:
   validation means, coupled to each comparator in the plurality of comparators, for enabling a comparator when the first partial address compared is valid and still in use by the first triangle pixel-pipeline's depth resolution logic, but for disabling the comparator once no more pixels need to be accessed by the first triangle pixel-pipeline in the range of the first partial address,
   whereby partial addresses are validated.

18. A method for processing triangles in parallel in a 3D-graphics system comprising:
   receiving of triangles from a host processor or geometry engine, the triangles representing surfaces of 3D objects projected onto a display screen;
   dispatching a triangle to one of a plurality of triangle pixel-pipelines by writing vertex attributes and gradients of the triangle to setup registers in a selected triangle pixel-pipeline;
   dispatching other triangles to other triangle pixel-pipelines in the plurality of triangle pixel-pipelines by writing vertex attributes and gradients of the triangle to setup registers in the triangle pixel-pipelines;
   processing the triangle in the selected triangle pixel-pipeline by:
      walking the edges of the triangle by determining endpoints where horizontal scan lines of the display screen intersect the edges;
      generating color and attributes for the endpoints from the color and attributes of a vertex and from color and attributes gradients indicating changes per unit distance within the triangle of the color and attributes;
      walking the spans within the triangle by determining locations of pixels along a span within the triangle on one of the horizontal scan lines of the display screen;
      generating color and attributes for the pixels from the color and attributes of an endpoint and from color and attributes gradients indicating changes per unit distance within the triangle of the color and attributes;

requesting access for a pixel-range of pixels in a frame buffer by sending part of an address of a pixel to a pixel-range comparator;

when the pixel-range comparator indicates that the pixel-range is not in use by another triangle pixel-pipeline's depth resolution logic:

updating pixels within the pixel-range in the frame buffer by writing colors adjusted for the attributes to pixel locations in the frame buffer;

wherein different triangles are processed by each triangle pixel-pipeline, wherein the frame buffer is written by each triangle pixel-pipeline; and wherein triangle pixel-pipelines stall when the pixel-range comparator signals that another triangle pixel-pipeline's depth resolution logic is accessing the pixel range requested, whereby triangles are processed in parallel by multiple triangle pixel-pipelines from the 3 vertexes of a triangle received by the triangle pixel-pipeline.

19. The method of claim 18 wherein the pixel-range is at least 16 pixels in length, the at least 16 pixels being on a same horizontal scan line.

20. The method of claim 18 further comprising:

when triangles are to be blended together for translucent effects or antialiasing or if the z-buffering is disabled:

pre-sorting pertinent triangles into a depth order and receiving the triangles from the host processor in the depth order;

dispatching the triangles to the triangle pixel-pipelines in the depth order;

performing a bounding-box comparison of a first box enclosing a triangle in a first pipeline to a second box enclosing a triangle in second pipeline;

signaling an overlap when the first box overlaps the second box;

stalling the second triangle pixel-pipeline when the overlap is signaled, whereby bounding boxes enclosing triangles are checked for overlap.

* * * * *